United States Patent

[11] 3,538,954

[72] Inventors Richard A. Fagerlie
　　　　　　Union Lake;
　　　　　　James R. Bowsher, Warren, Michigan;
　　　　　　James A. Neff, Bloomfield Township
　　　　　　Oakland County, Michigan
[21] Appl. No. 772,456
[22] Filed Oct. 14, 1968
　　　　　　Continuation-in-part of Ser. No. 657,813,
　　　　　　Aug. 2, 1967, abandoned.
[45] Patented Nov. 10, 1970
[73] Assignee MAC Valves, Inc.
　　　　　　Oak Park, Michigan
　　　　　　a corporation of Michigan

[54] SOLENOID VALVE HAVING A POPPET STEM AND SPRING BIASED FLOATING POLE PIECE
21 Claims, 8 Drawing Figs.
[52] U.S. Cl. .................................................. 137/625.65,
　　　　　251/129, 251/141; 335/259, 335/264
[51] Int. Cl. .............................................. F16k 11/02,
　　　　　F16k 31/02, H01f 2/08
[50] Field of Search .......................................... 335/259,
　　　　　264, 267; 251/129, 141; 137/625.65

[56]　　　　　　　References Cited
　　　　　　　UNITED STATES PATENTS
3,420,492　1/1969　Ray .......................... 251/129X
2,692,354　10/1954　Fisher ....................... 335/264X
2,910,089　10/1959　Yarber ...................... 137/625.65
2,930,404　3/1960　Kowalski et al. ............ 251/129X Primary Examiner—Henry T. Klinksiek
Attorney—Donnelly, Mentag and Harrington ABSTRACT: A solenoid-operated reversing valve having a poppet stem normally biased to a first position by a return spring and shiftable to a second position in opposition to the bias of the return spring by a solenoid plunger to effect a fluid seal at said second position, and which solenoid plunger is adapted to coact with a spring-biased floating solenoid pole piece which compensates for variations between the magnetic seal position of the solenoid plunger and the fluid seal position of the poppet stem so as to effect a substantially simultaneous magnetic seal between the solenoid plunger and the pole piece when the poppet stem effects the fluid seal between a poppet valve carried on the poppet stem and a valve seat.

Patented Nov. 10, 1970
3,538,954
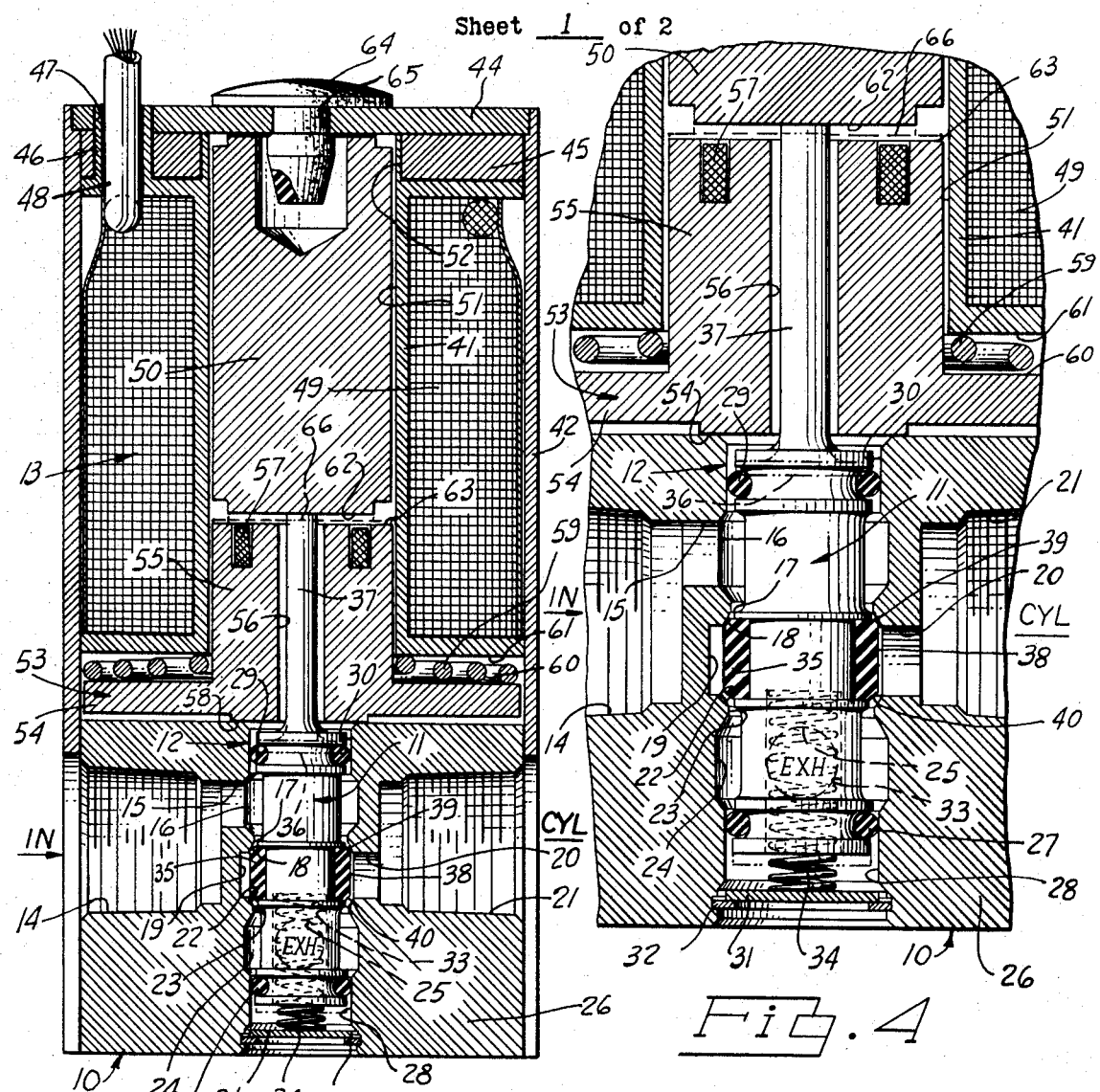
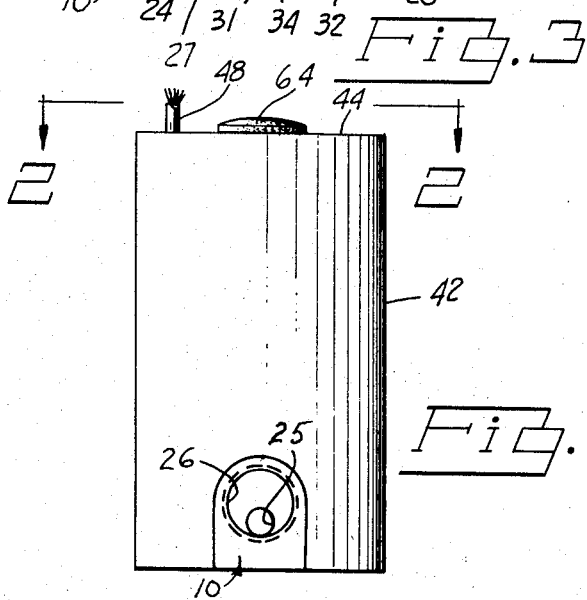
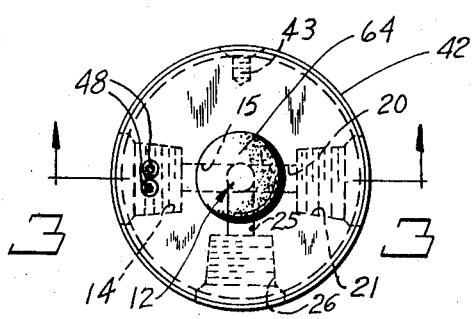
INVENTORS
RICHARD A. FAGERLIE
JAMES R. BOWSHER
JAMES A. NEFF
BY
Donnelly, Mentag & Harrington
ATTORNEYS

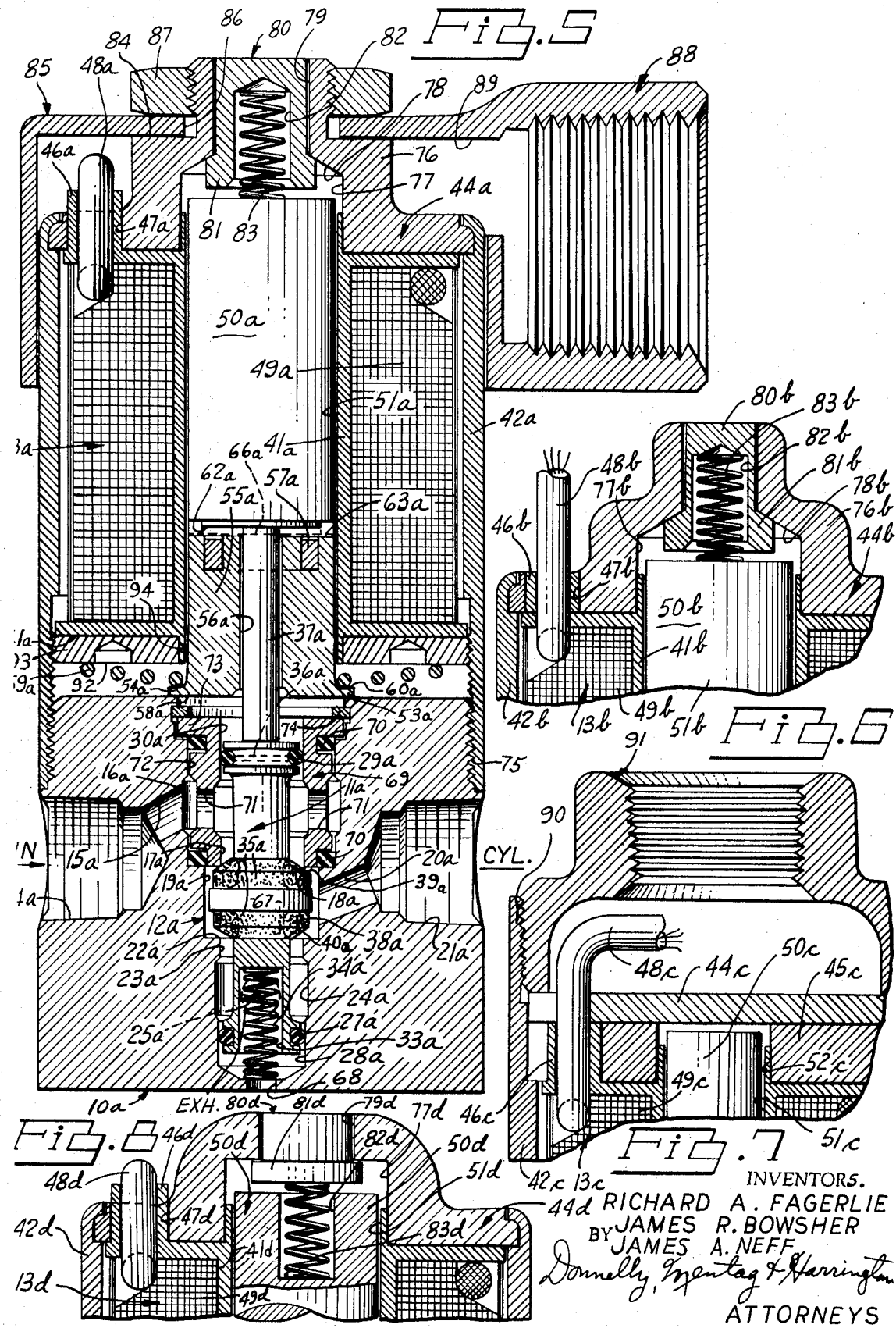

3,538,954

SOLENOID VALVE HAVING A POPPET STEM AND SPRING BIASED FLOATING POLE PIECE

SUMMARY OF THE INVENTION

This application is a continuation-in-part application of U.S. Pat. application Ser. No. 657,813, filed Aug. 2, 1967 and now abandoned.

This invention relates generally to solenoid-operated reversing valves, and more particularly, to a novel and improved solenoid reversing valve having a poppet stem and a spring-biased floating pole piece which is adapted to compensate for variations between the sealed or closed position of the solenoid and the sealed or closed position of the poppet valve on a valve seat.

Heretofore, poppet-type valve constructions have been employed to provide small, alternating current, solenoid-operated reversing valves with as large or maximum amount of flow as possible, and with a minimum stroke of the solenoid plunger. However, a disadvantage of such prior art valves is that it is not possible to achieve a substantially simultaneous solenoid seal and a fluid seal without the provision of some type of a flexible coupling between the solenoid and the poppet stem, such as a spring means, to allow the solenoid to seal magnetically after the valve elements have achieved the fluid seal and reduce the inrush current to a holding current level to prevent overheating of the solenoid. The problem of providing an efficient magnetic seal simultaneously with the effecting of the fluid seal is further complicated by the tolerances of the various parts of the solenoid and valve structures. Another disadvantage of the prior art valves of this type is that they have valve seats and valve ports disposed in certain locations on the solenoid plunger and valve structure, and are formed to certain sizes to provide the desired flow and pressure characteristics, but such valve seat and port locations and sizes cause unbalanced conditions in said valves.

Accordingly, in view of the foregoing, it is an important object of the invention to provide a solenoid-operated reversing valve which is constructed and arranged to overcome the aforementioned disadvantages of the prior art solenoid-operated reversing valves.

It is another object of the invention to provide a novel and improved solenoid-operated reversing valve which is provided with means for obviating the necessity of a flexible coupling between the solenoid and the poppet valve actuator, and which means includes a spring-biased floating pole piece that moves to close the solenoid magnetic circuit substantially simultaneous with the effecting of the valve closing by the solenoid plunger.

It is still another object of the invention to provide a novel and improved solenoid reversing valve which is provided with a balanced poppet-type valve construction that includes a circular poppet or seal of compressible material, such as rubber, which is molded to a supporting poppet stem in such a manner that when the poppet stem is inserted in a poppet valve bore of substantially smaller diameter than the poppet, the poppet will be compressed sufficiently to allow passage of the poppet into a central fluid transfer chamber or cavity in the valve and then expand and be reciprocated from one internal valve seat to another internal valve seat in said fluid transfer chamber to effect a valving action sufficiently balanced to permit ease of operation and short travel of the solenoid plunger and provide maximum flow with a minimum of power.

It is still a further object of the invention to provide a novel and improved solenoid-operated reversing valve which includes a valve body, said valve body being provided with at least one delivery port, and at least one exhaust port, said ports being connected to a valve stem bore which is axially disposed in the valve body and which has at least one valve seat formed therein, an axially shiftable poppet stem carrying a poppet seal mounted in the valve stem bore and movable from a first position to a second position to seat said poppet seal on said valve seat to control the flow of fluid between said ports, a return spring mounted in the valve body and operative to normally bias the poppet stem to said first position, a solenoid mounted on the valve body and having a solenoid plunger in contact with the poppet stem for moving the poppet stem from said first position to the second position when the solenoid is energized, and a spring-biased floating pole piece disposed in a normal position spaced apart from the solenoid plunger, whereby when the solenoid is energized, the solenoid plunger will move the poppet stem to said second position to effect the fluid seal with said valve seat and the mutual magnetic attraction between the solenoid plunger and the floating pole piece will move the pole piece into a closed magnetic seal with the solenoid plunger substantially simultaneous with the effecting of the fluid seal.

It is still another object of the present invention to provide a novel and improved solenoid-operated reversing valve which is provided with a movable solenoid pole piece which functions to compensate for the dimensional limits and tolerances of the various machined parts employed in the construction of the solenoid and valve structures.

It is a further object of the invention to provide a novel and improved solenoid-operated reversing valve which is provided with a balanced, poppet-type valve construction that includes a pair of circular poppets or seals made from a suitable compressible material and wherein the said poppets are operable in a valve chamber between two internal valve seats formed around bores of a smaller diameter than the diameter of said poppets to insure effective sealing between the poppets and the valve seats regardless of any change of diameter of the poppets due to wear or other reasons; and which poppets are molded to a supporting poppet stem and spaced apart by a circular metal flange having a diameter larger than the valve seat bores to prevent the poppet stem from being accidentally removed from the valve chamber.

It is still a further object of the invention to provide a novel and improved solenoid-operated reversing valve having a valve stem bore in which one valve seat is integrally formed, and a separately formed sleeve mounted in said bore and having a second valve seat formed thereon and disposed in a position spaced apart from said first valve seat, and axially shiftable poppet stem carrying a pair of poppet seals and movable between a first position and a second position to alternately seat said poppet seals on said valve seats to control the flow of fluid through the valve stem bore and between the usual inlet, delivery and exhaust ports, a return spring provided to normally bias the poppet stem to said first position, a solenoid having a plunger in contact with the poppet stem for moving the poppet stem from said first position to the second position when the solenoid is energized, and a spring means for normally maintaining the solenoid plunger in contact with the valve stem, and said valve being adapted to receive various types of end cover fittings, as for example, a conduit-type end cover fitting, a grommet-type end cover fitting, and an explosion-proof-type end cover fitting.

Other objects, features and advantages of this invention will be apparent from the following detailed description, appended claims, and the accompanying drawings.

In the drawings:

FIG. 1 is a side elevational view of a solenoid-operated reversing valve made in accordance with the principles of the present invention;

FIG. 2 is a top plan view of the structure illustrated in FIG. 1, taken along the line 2–2 thereof, and looking in the direction of the arrows;

FIG. 3 is an elevational section view of the structure illustrated in FIG. 2, taken along the line 3–3 thereof, and looking in the direction of the arrows;

FIG. 4 is a partial, enlarged, elevational section view of the floating pole piece, poppet stem, and valve seat structures shown in FIG. 3;

FIG. 5 is an elevational section view, similar to that of FIG. 3, of a second illustrative embodiment of the invention;

FIG. 6 is a fragmentary, elevational section view of the upper end of the second embodiment of FIG. 5, and showing said second embodiment provided with another type of housing end cover designated as a grommet-type end cover;

FIG. 7 is a fragmentary, elevational section view of the upper end of the first embodiment of FIG. 3, and showing said first embodiment provided with another type of housing end cover designated as an explosion-proof-type end cover; and FIG. 8 is a fragmentary, elevational section view of the upper end of the second embodiment of FIG. 5, and showing said second embodiment provided with still another type of housing end cover designated as a modified grommet-type end cover.

Referring now to the first illustrative embodiment shown in FIGS. 1 through 4 of the drawings, and in particular to FIG. 3, the numeral 10 generally designates a cylindrically shape valve body having a poppet stem that is generally indicated by the numeral 11 and which is movably mounted in an axially disposed valve stem bore that is generally indicated by the numeral 12. A solenoid, generally indicated by the numeral 13, is operatively mounted on the upper end of the valve body 10, and it is adapted to shift the poppet stem 11 from a first operative position to a second operative position, as more fully described in detail hereinafter.

The illustrated valve formed by the valve body 10, the poppet stem 11 and solenoid 13 is a solenoid-operated, three-way reversing valve. However, it will be understood that the invention is applicable to other types of solenoid-operated reversing valves, as for example, a two-way reversing valve or a four-way reversing valve. The solenoid construction of the present invention is adaptable to any application where compensation is required for tolerances between a first position and a second position of a valve stem or other member moved by the solenoid.

As shown in FIG. 3, the illustrated three-way reversing valve includes an inlet or supply port 14 that communicates through a radial fluid passage 15 with an annular inlet chamber 16 which is formed in the wall of the valve stem bore 12. The inlet chamber 16 is connected through the valve stem bore portion 17 and a first valve seat or orifice 18 to an annular fluid transfer pocket or chamber 19 that is formed in the wall of the valve stem bore 12, and which is connected by the radial fluid passage 20 to a fluid delivery port or cylinder port 21. The supply port 14 and the cylinder port 21 are disposed on the same transverse plane. The cylinder port or delivery port 21 is adapted to function as a port for delivery and exhaustion of fluid under pressure to and from a fluid cylinder or other device to be supplied with fluid under pressure.

As shown in FIG. 3, the annular fluid transfer chamber 19 is connected through a second valve seat or orifice 22 and the valve stem bore portion 23 to an annular exhaust chamber 24 that is formed in the wall of the valve stem bore 12. The exhaust chamber 24 communicates through the radial fluid passage 25 with an exhaust port 26 (FIG. 2). It will be understood that the inlet port 14 would be connected to a suitable source of fluid under pressure, as for example, a source of pressurized air. The illustrated valve is constructed as a normally closed valve, but it may be changed to a normally open valve by switching the flow through the inlet and exhaust ports 14 and 26, respectively. That is, the exhaust port 26 may be used as a pressurized fluid inlet port, and the inlet port 14 may be used as an exhaust port.

As shown in FIGS. 3 and 4, the poppet stem 11 is substantially cylindrical in overall configuration and is provided with a first O-ring seal 27 which engages the lower end portion 28 of the valve stem bore 12. The poppet stem 11 is also provided with a second O-ring seal 29 which is spaced apart upwardly from the lower O-ring seal 27 and which operatively engages the upper valve stem bore portion 30. It will be seen that the diameters of the valve stem bore portions 28 and 30 are the same, and the O-ring seals 27 and 29 are equal in size.

As shown in FIGS. 3 and 4, the lower end of the valve stem bore 12 is enclosed by a thin disc 31 which functions as a spring seat. The disc 31 is retained in place by a releasable retainer ring 32. The poppet stem 11 is provided with an axial, inwardly extended pocket 33 on the lower end thereof in which is seated a compression return spring 34. The outer end of the return spring 34 is seated on the disc 31. The poppet stem 11 is provided with a bonded annular poppet valve seal 35 at an intermediate position between the O-rings 27 and 29. The poppet valve seal 35 is adapted to seat alternately on the valve seats 18 and 22 when the poppet stem 11 is shifted between its two operative positions. As shown in FIG. 3, the return spring 34 normally biases the poppet stem 11 upwardly to the solid line position which is the first or deenergized position so as to normally close the passages between the inlet port 14 and the cylinder port 21 and communicate the exhaust chamber 24 with the cylinder port 21. The broken line position 36 (FIGS. 3 and 4) of the poppet stem 11 and its operating shaft 37 is the second or actuated position to which the poppet stem 11 is shifted by the solenoid 13 when it is energized, as more fully described hereinafter, so as to open the passages between the inlet port 14 and the delivery port 21 and close the passages between the cylinder port 21 and the exhaust port 26.

As best seen in FIG. 4, the outer diameter 38 of the poppet valve seal 35 is larger than the diameter of the poppet valve stem bore 12. The poppet valve seal 35 is circular in cross section and is made from a compressible material, such as rubber, which is molded to the supporting poppet stem 11 in such a manner so that when the poppet stem 11 is inserted into the valve bore 12 the valve seal 35 will compress sufficiently to allow it to be passed into the central transfer chamber 19 where it will then expand to its normal or free state. The poppet valve seal 35 is cylindrical in overall configuration and the upper and lower ends thereof are slightly chamfered as indicated by the numerals 39 and 40, respectively. The valve seats 18 and 22 are spaced apart axially and are disposed at the upper and lower ends of the transfer chamber 19, and the surfaces of these valve seats are slightly conical in shape so as to provide diverging surfaces facing the chamber 19. As shown in FIG. 4, the upper end surface of the valve seal 35 is seated against the valve seat 18 to effect a poppet valve action and a similar poppet valve action is effected when the poppet stem 11 is moved downwardly to the dotted line position 36 so as to seat the lower chamfered seal periphery 40 on the lower valve seat 22.

As shown in FIG. 4 the valve of the present invention is a substantially balanced valve since the sealing diameters are all substantially equal. That is, the diameter of the valve stem bore portion 30 is substantially equal to the sealing diameter effected by the valve seal 35 against the valve seat 18, and the diameter of the valve stem bore portion 28 is also equal to the diameter of the valve stem bore portion 30 and the effective sealing diameters formed when the valve seal 35 engages the valve seats 18 and 22.

The poppet valve seal 35 has only to be moved a very short distance in order to effect a valving action in conjunction with the valve seats 18 and 22. For example, in one embodiment the stroke of the valve stem 11 was about .025 of an inch. The valve structure of the present invention provides a valve which may be provided with relatively large valve seats or orifices 18 and 22 to provide a relatively large flow of pressurized fluid over a much broader pressure range than was heretofore possible with the prior art valves. The aforementioned illustrative embodiment with the .025 of an inch stroke is adapted to operate over a pressure range of from vacuum to 150 p.s.i. The valve of the present invention is substantially a balanced valve with a slight pressure differential being developed at the point of contact between the poppet valve seal 35 and the valve seat 22 when the poppet stem 11 is shifted to the broken line position 36. This slight pressure differential assists the sealing action and it is caused by the valve seal 35 flattening out slightly when it seats on the valve seat 22 and reducing the area at the lower end of the valve seal 35.

As shown in FIG. 3, the solenoid 13 includes a coil bobbin or support member 41 which is cylindrically shaped and mounted by a slip fit in the cylindrical solenoid housing or cover 42. The solenoid cover 42 is open at the lower end thereof and it is telescopically mounted over the valve body 10. The cover 42 is secured to the valve body 10 by any suitable means, as by the screw 43 (FIG. 2). The solenoid cover 42 may be made from any suitable magnetic material. The upper end of the solenoid cover 42 is enclosed by a nonmagnetic end plate 44 which is adapted to be secured in place by any suitable method as by staking or by brazing. A flux plate 45, made from a suitable magnetic material, is mounted in the upper end of the solenoid cover 42 between the end plate 44 and the coil bobbin 41. The coil bobbin 41 has an extension or protrusion 46 that extends through an aperture 47 formed in the end plate 44 and which functions as a grommet for the solenoid coil lead wires 48.

The coil bobbin 41 may be made from any suitable material, as for example, a molded plastic impregnated with fiber glass. The coil bobbin 41 carries a solenoid coil assembly 49 which surrounds a solenoid plunger or armature 50. The solenoid plunger 50 is slidably mounted in the bobbin bore 51 and the flux plate bore 52, and there is a clearance between the end plate 44 and the plunger 50 when the plunger 50 is in the solid line position of FIG. 3 with the seal 35 on valve seat 18. The solenoid coil assembly 49 is adapted to be connected to a suitable source of alternating current by the aforementioned lead wires or electrical cables 48.

As shown in FIG. 3, the solenoid 13 includes a floating or axially movable, spring-biased pole piece which is generally indicated by the numeral 53. The floating pole piece 53 is inverted T-shaped in cross section, and it includes an annular flange portion 54 which is disposed between the lower end of the coil bobbin 41 and the top end of the valve body 10. The floating pole piece 53 further includes the cylindrical shaft 55 which is integral with the plate portion 54 and which extends axially upward into the bobbin bore 51. The floating pole piece shaft 55 is provided with an axial bore 56 through which passes the operating shaft 37 of the poppet stem 11. The floating pole piece shaft 55 carries a circular shading coil 57 on the upper end thereof, in a position facing the lower end of the solenoid plunger 50. The shading coil 57 provides an overlapping magnetic flux seal to insure holding of the solenoid plunger 50 against the floating pole piece 53 when the solenoid coil assembly 49 is energized with alternating current.

The floating pole piece 53 is normally biased downwardly by the coil spring 59 so that the annular shoulder 58 on the lower end of the pole piece seats on the upper end of the valve body 10. The coil spring 59 is seated around the floating pole piece shaft 55 and the lower end thereof seats on the upper face 60 of the annular flange 54, and the upper end of the spring 59 seats against the lower surface 61 of the coil bobbin 41. The space between the lower end 62 of the solenoid plunger 50 and the upper end 63 of the floating pole piece shaft 55 comprises the initial air gap between these members when the solenoid coil assembly 49 is deenergized. In one embodiment the spring 59 was formed to provide a working force of 2 pounds while the poppet stem return spring 34 was formed to provide a working force of 1 pound. The numeral 64 designates a dust shield which encloses the plunger access hole 65 formed in the end plate 44.

In operation, the initial normally closed positions of the poppet stem 11 and the solenoid plunger 50 are shown by the solid line positions of these parts in FIGS. 3 and 4. Fluid under pressure enters the inlet port 14 and passes through the passage 15 into the inlet chamber 16. The valve seal 35 is seated on the valve seat 18 under the biasing action of spring 34 and the fluid is blocked in the inlet chamber 16. The fluid in the device being controlled by the valve is exhausted through the cylinder port 21, the passage 20, the transfer chamber 19, the valve stem bore portion 23, the exhaust chamber 24, the passage 25 (FIG. 2), and the exhaust port 26. When it is desired to admit fluid to said device through the cylinder port 21, the solenoid coil assembly 49 is energized and the plunger 50 is pulled downwardly so as to overcome the force of spring 34 and move the poppet stem shaft 37 and the integral poppet stem 11 downwardly to the broken line position indicated by the numeral 36 in FIGS. 3 and 4. The poppet valve seal 35 is thus moved from the initial seating engagement on valve seat 18 to a second operative position on the valve seat 22. The fluid passages between the cylinder port 21 and the exhaust port 26 are blocked, and the passages between the cylinder port 21 and the exhaust port 26 are blocked, and the passages between the cylinder port 21 and the inlet port 14 are opened. Fluid under pressure then passes from the inlet chamber 16 and through the valve seat 18, the transfer chamber 19, the passage 20, and out through the cylinder port 21 to the device being provided with fluid under pressure.

The aforedescribed action effects the fluid seal between the valve seal 35 and the valve seat 22. The magnetic seal between the lower end of the solenoid plunger 50 and the upper end of the floating pole piece shaft 55 is effected in a substantially simultaneous action with the fluid sealing action. Assuming that the initial air gap between the lower end 62 of the solenoid plunger 50 and the upper end 63 of the floating pole piece shaft 55 is equal to about .040 inches, after the solenoid plunger 50 has moved downwardly for a travel of about .025 inches so as to move the valve seal 35 into seating engagement with the valve seat 22, there will be about a .015 inch gap between said two surfaces. During said travel of .025 inches, the floating pole piece spring 59 overcomes the mutual attraction of the solenoid plunger 50 and the floating pole piece 53 and maintains the pole piece in the solid line position shown in FIGS. 3 and 4. However, after the solenoid plunger 50 has moved through said .025 inches travel and reached a positive stop with the valve seal 35 seated on the valve seat 22, the attraction between the solenoid plunger 50 and the floating pole piece shaft 55 increases so that at this point the mutual attraction between the solenoid plunger 50 and the floating pole piece 53 is strong enough to overcome the holding-down force of the spring 59, and the floating pole piece 53 snaps upwardly to meet the solenoid plunger 50 along the broken line 66 and effect a closed magnetic circuit between the solenoid plunger 50 and the floating pole piece 53 and reduce the inrush current to a holding current. The floating pole piece 53 compensates for machine tolerances between the various parts of the solenoid and valve structures.

The structure of the valve of the present invention compensates for variations between the sealed or closed position of the solenoid and the sealed or closed position of the poppet seal 35 on the valve seat 22. The floating pole piece 53 obviates the necessity for any flexible coupling between the poppet stem and the solenoid plunger 50 as is required in the prior art alternating current, solenoid-operated reversing valves. The circular poppet seal 35 has an effective sealing diameter equal to the outer diameter of the seals 27 and 29 when the seal 35 engages the valve seats 18 and 22 and provides a poppet valve structure which is adapted to be reciprocated from one operative position to another with a balanced valving action with ease of operation, and with a minimum stroke of the solenoid plunger 50 and poppet stem 11.

FIG. 5 illustrates a second embodiment of the invention. The parts of the second embodiment of FIG. 5 which are the same as the parts of the first embodiment of FIGS. 1 through 4 have been marked with corresponding reference numerals followed by the small letter "a". The second embodiment of FIG. 5 functions in the same manner as the first embodiment of FIGS. 1 through 4.

One of the differences between the second embodiment of FIG. 5 and the first embodiment of FIGS. 1 through 4 is that the poppet seal means has been made in two parts which are indicated by the numerals 35a. The two poppet seal members 35a are molded on the poppet stem 11a on opposite sides of a metal flange 67. The metal flange 67 is formed with an outer diameter larger than the diameter of the bores 17a and 23a through the valve seats 18a and 22a, respectively. The metal flange 67 functions to prevent the poppet stem 11a from being pulled out of the valve stem bore 17a. The poppet seal members 35a are formed with an outer diameter larger than the valve stem bores 17a and 23a so that they engage the valve seats 18a and 22a on the outer end faces of the seal members 35a. As shown in FIG. 5, the end faces 39a and 40a of the seal members 35a are chamfered where they engage the valve seats 18a and 22a. An advantage of the seal members 35a being formed to an outer diameter larger than the bore 17a is that the seal members 35a will always function in an efficient manner to form a seal on the seats 18a and 22a, regardless of wear on the outer diameter of the seal members 35a.

As shown in FIG. 5, the return spring 34a is not supported by any disc, as the disc 31 shown in the first embodiment of FIG. 3. The return spring 34a seats against the inner end wall of the valve stem bore 12a. A vent bore 68 is formed in the valve body 10a and communicates with the valve stem bore portion 28a.

As shown in FIG. 5, one of the valve seats, namely, 22a, is formed as a part of the valve body 10a. The other valve seat 18a is formed on a valve seat carrier or sleeve 69 which is slidably mounted in the enlarged outer end 72 of the valve stem bore 12a. The valve seat carrier 69 is provided with a pair of annular seal members 70 for sealing engagement with the enlarged valve stem bore portion 72. The valve seat carrier 69 is provided with a flange 73 against which is mounted the retainer ring 74 for retaining the valve seat carrier 69 in the valve seat bore portion 72. The valve stem bore portion 17a communicates with the inlet chamber 16a by means of a plurality of transverse bores 71.

In the structure of the second embodiment of FIG. 5, the poppet valve stem operating shaft 37a is separately formed from the poppet stem 11a and functions as a connecting pusher rod between the poppet stem 11a and the solenoid plunger 50a. The solenoid cover 42a is threadably mounted on the valve body 10a as indicated by the reference numeral 75.

A further difference between the second embodiment of FIG. 5 and the first embodiment of FIGS. 1 through 4 is that the floating pole piece annular flange 54a is reduced in thickness and in outer diameter as compared to the annular flange 54. The coil spring 59a has its lower end seated on the upper face 60a of the reduced size annular flange 54a. The upper end of the spring 59a seats against the lower face 92 of a retainer ring 93. The retainer ring 93 may be made from any suitable magnetic material and it is threadably mounted on the inside of the solenoid cover 42. The upper face of the retainer ring 93 abuts the lower face 61a of the coil bobbin 41a. The retainer ring 93 is seated around a cylindrical, axial extension 94 on the lower end of the coil bobbin 41a. The retainer ring 93 retains the coil bobbin 41a in position in the housing 42a.

As shown in FIG. 5, the upper end of the solenoid housing 42a is enclosed by an end plate 44a which is made from a suitable magnetic material. The end plate 44a is adapted to be secured in place by any suitable method, as by staking or by brazing. The end plate 44a is provided with an axially extended boss or projection 76 in which is formed a bore 77 for the reception of the upper end of the solenoid plunger 50a. The bore 77 communicates with a smaller diameter bore 79 in which is slidably mounted a manual operator or button generally indicated by the numeral 80. The button 80 is made from a suitable nonmagnetic material and is provided on the inner end thereof with an external flange 81 that has a tapered outer surface which seats on and mates with a tapered shoulder surface 78 between the bores 77 and 79. A dead end bore 82 is formed on the inner end of the button 80 and provides a recess for a resilient positioning means or spring 83. The inner end of the spring 83 engages the outer end of the solenoid plunger 50a and provides a force sufficient to always maintain the solenoid plunger 50a in engagement with the poppet valve stem operating shaft 37a, regardless of what position the valve may be disposed in.

The second embodiment of FIG. 5 is provided with a conduit-type end cover or housing which has an end cap portion 85 slidably mounted over the solenoid end plate 44a. The end wall of the cap 85 is provided with a circular hole 86 for the reception of the reduced outer end of the boss 76, to permit the end cap 85 to be seated on the shoulder 84 on the boss 76. A lock nut 87 is threadably mounted on the reduced outer end of the boss 76 to retain the end cap 85 in place. Integrally formed on one side of the cap 85 is a conduit fitting 88. The conduit fitting 88 communicates through the opening 89 with the interior of the end cap 85 to permit the solenoid lead wires 48a to be connected to a suitable source of electric power. The conduit fitting 88 also functions as a means for mounting the valve in an operative position.

An advantage of the structure of the second embodiment of FIG. 5 is that it may be economically manufactured, because the valve stem bore 12a, with its various stepped portions, and the valve seat 22a may be economically and easily machined. The valve structure of FIG. 5 is advantageous in that it may be quickly and easily disassembled for repair purposes.

FIG. 6 is a fragmentary, elevational, section view of the upper end of the second embodiment of FIG. 5, showing the valve structure of FIG. 5 provided with another type of housing end cover designated as a grommet-type end cover. The parts of the solenoid housing and valve structure of FIG. 6 which are similar to the structure of FIG. 5 have been marked with the same reference numerals followed by the small letter "b". In the embodiment of FIG. 6, the end plate boss 76b is not provided with any threaded end portion or other structure for mounting the conduit end cap 85. The valve structure of the embodiment of FIG. 6 functions in the same manner as the valve structure of the previously described embodiments.

FIG. 7 is a fragmentary, elevational, section view of the upper end of the first embodiment of FIG. 3, showing said first embodiment provided with another type of housing end cover designated as an explosion-proof type end cover. The parts of the valve structure illustrated in FIG. 7 which are the same as the valve structure of FIG. 3 have been marked with the corresponding reference numerals followed by the small letter "C". In the embodiment of FIG. 7 the solenoid cover 42c is provided with an axially extended, internally threaded upper end 90 in which is threadably mounted the threaded conduit fitting 91. The threaded conduit fitting 91 forms a mounting means for the valve of FIG. 7, as well as a conduit for the solenoid lead wires 48C. The fitting 91 abuts the end plate 44c which is nonmagnetic and retains the upper pole piece 45c in position.

FIG. 8 is a fragmentary, elevational, section view of the upper end of the second embodiment of FIG. 5 showing said second embodiment provided with still another type of housing end cover 44d designated as a modified grommet-type end cover. The parts of the structure of FIG. 8 which are the same as the structure parts of FIG. 5 have been marked with the same reference numerals followed by the small letter "d. The only difference between the grommet-type end cover of FIG. 6 and the structure of FIG. 8 is that the solenoid plunger biasing spring 83d in the embodiment of FIG. 8 is seated in a spring recess 82d which is formed in the outer end of the solenoid plunger 50d, instead of in the manual operator or button 80d.

While it will be apparent that the preferred embodiments of the invention herein disclosed are well calculated to fulfill the objects above stated, it will be appreciated that the invention is susceptible to modification, variation and change.

We claim:

1. A solenoid-operated reversing valve comprising:
   a. a valve body having a valve stem bore with a valve seat, and having at least one delivery port, and at least one exhaust port, and said ports communicating with said valve stem bore and valve seat;
   b. a poppet stem, carrying a poppet seal means, movably mounted in said valve stem bore and shiftable between a first position to a second position to seat said poppet seal means on said valve seat to form a fluid seal to control the flow of fluid between said ports;
   c. biasing means mounted in the valve body and engaged with said poppet stem to normally bias the poppet stem to said first position;

d. a solenoid mounted on the valve body and having a solenoid plunger in contact with the poppet stem and normally moved by said poppet stem to a position adjacent one end of the solenoid and for moving the poppet stem from said first position to the second position in opposition to said biasing means when the solenoid is energized; and e. a floating pole piece disposed in a position adjacent the other end of the solenoid and including means for normally biasing the floating pole piece to a position spaced apart from the solenoid plunger, whereby when the solenoid is energized the solenoid plunger will move the poppet stem to said second position to effect a fluid seal with said valve seat, and the mutual magnetic attraction between the solenoid plunger and the floating pole piece will move the pole piece into a closed magnetic seal with the solenoid plunger substantially simultaneous with the effecting of said fluid seal.

2. A solenoid-operated reversing valve as defined in claim 1, wherein said means for biasing said floating pole piece apart from the solenoid plunger comprises a spring means.

3. A solenoid-operated reversing valve as defined in claim 1, wherein said biasing means for normally biasing the poppet stem to said first position comprises a return spring.

4. A solenoid-operated reversing valve as defined in claim 3, wherein said solenoid plunger is normally biased by said poppet stem into a deenergized position.

5. A solenoid-operated reversing valve as defined in claim 3, wherein said solenoid plunger is normally biased by said poppet stem into a deenergized position against a resilient positioning means.

6. A solenoid-operated reversing valve as defined in claim 5, wherein said resilient positioning means comprises a spring means mounted in a manual solenoid operator member.

7. A solenoid-operated reversing valve as defined in claim 1, wherein:
a. said valve stem bore has a longitudinally extended fluid transfer chamber formed around the periphery thereof, with said first-named valve seat being disposed at one end of said transfer chamber, and with a second valve seat being disposed at the other end of said transfer chamber and an inlet port communicating with said second valve seat; and
b. said poppet seal means being made to a diameter slightly larger than the diameter of the bore through valve seats and being made from a compressible material.

8. A solenoid-operated reversing valve as defined in claim 7, wherein:
a. said valve seats are integrally formed on said valve body at the opposite ends of said fluid transfer chamber; and
b. said poppet seal means comprises a unitary seal member, with one end of said seal member being adapted to engage said second valve seat when the poppet seal member is in said first position, and the other end of said seal member being adapted to engage said first-named valve seat when the poppet seal member is in said second position, and whereby the poppet seal member may be compressed and inserted into said fluid transfer chamber, and after the insertion of the poppet seal member into said chamber, the poppet seal member will expand and be movable between said first and second positions.

9. A solenoid-operated reversing valve as defined in claim 7, wherein:
a. one of said valve seats is integrally formed on said valve body at one end of said fluid transfer chamber, and the other of said valve seats is formed on a tubular valve seat carrier member mounted in the valve stem bore and in a position spaced apart from said one valve seat; and
b. said poppet seal means comprises a pair of poppet seal members mounted on said valve stem and being spaced apart by a flange.

10. A solenoid-operated reversing valve as defined in claim 9, wherein said flange has an outer diameter larger than the bore through the valve seats.

11. A solenoid-operated reversing valve as defined in claim 7, wherein:
a. said poppet stem is provided with an annular sealing means on each side of said poppet seal means in positions spaced apart longitudinally from the poppet seal means; and
b. said annular sealing means are each formed to an effective sealing diameter equal to the effective sealing diameter of the poppet seal means to provide a balanced poppet valve construction.

12. A solenoid having a solenoid plunger contacting an extension on the operating member of an apparatus for pushing said operating member from a first position to a second position, comprising:
a. a housing;
b. a solenoid coil mounted in said housing and having a solenoid plunger bore formed therethrough and slidably receiving said operating member extension;
c. a solenoid plunger movably mounted in the solenoid coil bore and normally biased by said operating member extension to a first position adjacent one end of the coil; and
d. a floating pole piece disposed adjacent the other end of the coil and normally biased to a position spaced apart from the solenoid plunger, whereby when the solenoid coil is energized the solenoid plunger will be pulled inwardly in the solenoid bore to its energized position in said bore, and the floating pole piece will be pulled toward the solenoid plunger and into magnetic sealing contact therewith, while said operating member is moved from a first position to a second position.

13. A solenoid as defined in claim 12, wherein said floating pole piece comprises:
a. an inverted T-shaped in cross section member disposed transversely to the axis of movement of the solenoid plunger; and
b. means for normally biasing the T-shaped in cross section member to said position spaced apart from the solenoid plunger.

14. A solenoid as defined in claim 13, wherein said means for normally biasing the T-shaped in cross section member to said position spaced apart from the solenoid plunger comprises a spring means.

15. A solenoid as defined in claim 14, wherein:
a. said inverted T-shaped in cross section member includes a shaft extended into said solenoid coil bore, and a flange on said shaft; and
b. said spring means is disposed about said shaft between said solenoid coil and said flange.

16. A solenoid as defined in claim 12, including a flux plate disposed on said one end of the coil opposite to the end of the coil at which the floating pole piece is disposed.

17. A solenoid as defined in claim 12, including a shading coil disposed on said floating pole piece, on the end thereof adjacent said coil.

18. The structure as defined in claim 12, wherein:
a. said apparatus comprises a fluid flow control valve; and
b. said operating member comprises an axially movable poppet stem.

19. A solenoid as defined in claim 12, wherein said housing is provided with a conduit type end structure.

20. A solenoid as defined in claim 12, wherein said housing is provided with a grommet-type end structure.

21. A solenoid as defined in claim 12, wherein said housing is provided with an explosion-proof-type end structure.

PO-1050
(5/69)

UNITED STATES PATENT OFFICE
CERTIFICATE OF CORRECTION

Patent No. 3,538,954  Dated November 10, 1970

Inventor(s) Richard A. Fagerlie, James R. Bowsher and James A. Nef

It is certified that error appears in the above-identified patent and that said Letters Patent are hereby corrected as shown below:

Column 2, line 40, after "scat", "and" should be --an--.
Column 3, line 14, after "cylindrically", "shape" should be --shaped--
Column 6, line 7 following "and", cancel "the exhaust port 26 are". Co
6, line 8, cancel "blocked, and the passages between the cylinder port and".

SIGNED AND
SEALED

FEB 23 1971

(SEAL)
Attest:

Edward M. Fletcher, Jr.
Attesting Officer

WILLIAM E. SCHUYLER, JR
Commissioner of Patents